United States Patent Office 3,595,945
Patented July 27, 1971

3,595,945
N-PHENYL-N-HYDROXY(ALKOXY) - α - (O,O-DI-ALKYLPHOSPHORO(di)THIOATE)-ACETAMIDES
John Krenzer, Oak Park, and Sidney B. Richter, Chicago, Ill., assignors to Velsicol Chemical Corporation, Chicago, Ill.
No Drawing. Filed Dec. 28, 1967, Ser. No. 694,068
Int. Cl. C07f 9/16; A01n 9/36
U.S. Cl. 260—943                                     11 Claims

ABSTRACT OF THE DISCLOSURE

A compound of the formula:

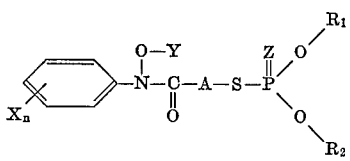

wherein $n$ is an integer of from 0 to 3; X is selected from the group consisting of a halogen, an aliphatic radical, nitro, hydroxy, alkoxy, acyl, acyloxy, and cyano; Y is selected from the group consisting of hydrogen, alkyl, acyl, alkoxycarbonyl, alkylthiocarbonyl and a carbamoyl radical; A is alkylene; Z is selected from the group consisting of oxygen and sulfur; and $R_1$ and $R_2$ are selected from the group consisting of alkyl and phenyl. The compounds are pesticides.

---

This invention relates to new compounds and to pesticidal compositions containing such compounds as well as to methods of utilizing such compositions to control pests.

The compounds of this invention can be represented by the following formula:

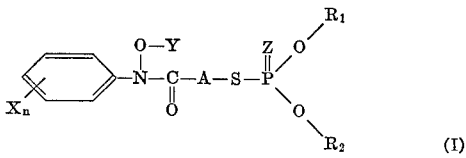

wherein $n$ is an integer of from 0 to 3; X is selected from the group consisting of a halogen, an aliphatic radical, nitro, hydroxy, alkoxy, acyl, acyloxy, and cyano; Y is selected from the group consisting of hydrogen, alkyl, acyl, alkoxycarbonyl, alkylthiocarbonyl and a carbamoyl radical; A is alkylene; Z is selected from the group consisting of oxygen and sulfur; and $R_1$ and $R_2$ are selected from the group consisting of alkyl and phenyl and when $n$ is greater than one, X can be the same or different. The compounds represented by the above general formula are effective as pesticides and particularly as insecticides, fungicides, nematocides and miticides.

The compounds of this invention can be prepared in general by reacting an amide of the formula:

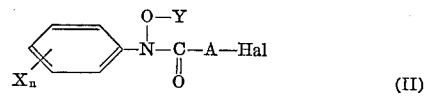

with a phosphorus acid of the formula:

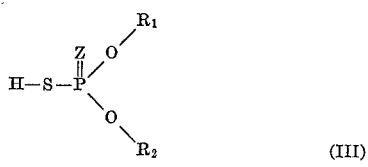

where $n$, X, Y, A, Z, $R_1$ and $R_2$ have the same significance as for Formula I above and where Hal is a halogen such as chlorine or bromine. For example, X can be halo such as chloro, bromo, iodo, or fluoro; an aliphatic radical such as alkyl of from 1 to about 5 carbon atoms or alkenyl of from 2 to about 5 carbon atoms; hydroxy; nitro; alkoxy where the alkyl portion contains from 1 to 5 carbon atoms; acyl or acyloxy such as saturated or unsaturated acyl or acyloxy containing from 1 to about 5 carbon atoms; or cyano; Y can be hydrogen, alkyl of from 1 to about 5 carbon atoms, acyl of the formula:

where $R_a$ is an alkyl group of from 1 to about 5 carbon atoms; alkoxycarbonyl or alkylthiocarbonyl of the formula:

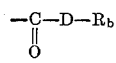

where D is an oxygen or sulfur atom, respectively, and where $R_b$ is alkyl of from 1 to about 5 carbon atoms; or a carbamoyl radical of the formula:

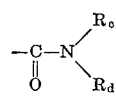

where $R_c$ and $R_d$ Are selected from hydrogen, phenyl or alkyl of from 1 to about 5 carbon atoms; A is a branched or straight chain alkylene group; and $R_1$ and $R_2$ are selected from phenyl or alkyl of from 1 to about 5 carbon atoms.

The substituents X, Y, $R_1$ and $R_2$ of Formula I, illustrated above, can also be substituted, where possible, with such groups as halo, hydroxy, alkoxy, acyl, acyloxy, nitro or combinations thereof. For example, X can be haloalkyl, such as chloromethyl, trifluoromethyl; hydroxyalkyl, such as 3-hydroxypropyl; nitroalkyl such as 2-nitroethyl; or haloacyl such as trichloroacetyl; Y can be haloalkyl; or haloacyl such as trichloroacetyl and $R_1$ and $R_2$ can be haloalkyl or halophenyl.

Suitable amides of Formula II which can be reacted with the phosphorus acid of Formula III include:

N-4-chlorophenyl-N-hydroxy-α-chloroacetamide,
N-3,4-dichlorophenyl-N-hydroxy-α-chloroacetamide,
N-4-bromophenyl-N-hydroxy-α-chloroacetamide,
N-4-methylphenyl-N-hydroxy-α-chloroacetamide,
N-3-methylphenyl-N-hydroxy-β-chloropropionamide,
N-3-ethylphenyl-N-hydroxy-β-chloropropionamide,
N-4-chlorophenyl-N-hydroxy-β-chloropropionamide,
N-4-nitrophenyl-N-hydroxy-γ-chlorobutyramide,
N-4-hydroxyphenyl-N-hydroxy-β-chloroisobutyramide,
N-3-methoxyphenyl-N-hydroxy-α-chloroacetamide,
N-4-cyanophenyl-N-hydroxy-α-chloroacetamide,
N-2,6-dimethylphenyl-N-hydroxy-α-chloroacetamide,
N-4-trifluoromethylphenyl-N-hydroxy-α-chloroacetamide,
N-4-ethylphenyl-N-methoxy-α-chloroacetamide,
N-4-bromophenyl-N-methoxy-β-chloropropionamide,
N-3-nitrophenyl-N-methoxy-α-chloropropionamide,
N-3,4-dibromophenyl-N-methoxy-α-chloroacetamide,
N-3-propyl-4-nitrophenyl-N-ethoxy-β-chloroisobutyramide,
N-2,4,6-trichlorophenyl-N-ethoxy-β-chloroisobutyramide,
N-4-hydroxyphenyl-N-methoxy-α-chloroacetamide,
N-2-bromo-4-chlorophenyl-N-methoxy-β-chloropropionamide,
N-4-chlorophenyl-N-propoxy-α-chloroacetamide,
N-3-chloro-4-methoxyphenyl-N-butoxy-α-chloroacetamide, N-3-nitro-4-methylphenyl-N-carbamoyloxy-α-
 chloroacetamide,
N-4-chlorophenyl-N-(N-methylcarbamoyloxy)-β-
 chloropropionamide,
N-4-bromophenyl-N-(N,N-dimethylcarbamoyloxy)-γ-
 chlorobutyramide,
N-2-methoxy-6-ethylphenyl-N-(N-phenylcarbamoyloxy)-
 α-chloroacetamide,
N-phenyl-N-acetoxy-α-chloroacetamide,
N-4-chlorophenyl-N-acetoxy-α-chloroacetamide,
N-3-bromophenyl-N-methoxycarbonyloxy-α-
 chloroacetamide, or
N-2,6-dimethylphenyl-N-methylthiocarbonyloxy-α-
 chloroacetamide.

The phosphorus acids of Formula III which can be reacted with the above illustrated amides of Formula II include both phosphorothioic acids, that is, where Z is oxygen and phosphorodithioic acids, that is where Z is sulfur. Suitable acids include:

O,O-dimethyl-phosphorothioic,
O,O-diethyl-phosphorothioic,
O,O-dipropyl-phosphorodithioic,
O,O-dichloropropyl-phosphorothioic,
O,O-dibutyl-phosphorothioic,
O,O-dipentyl-phosphorothioic,
O-methyl-O-ethyl-phosphorothioic,
O-ethyl-O-propyl-phosphorothioic,
O,O-diphenyl-phosphorothioic,
O,O-di-4-chlorophenyl-phosphorothioic,
O-phenyl-O-ethyl-phosphorothioic,
O-3-chlorophenyl-O-ethyl-phosphorothioic,
O-phenyl-O-methyl-phosphorothioic,
O,O-dimethyl-phosphorodithioic,
O,O-diethyl-phosphorodithioic,
O,O-dipropyl-phosphorodithioic,
O,O-dichloropropyl-phosphorodithioic,
O,O-dibutyl-phosphorodithioic,
O,O-dipentyl-phosphorodithioic,
O-methyl-O-ethyl-phosphorodithioic,
O-isopropyl-O-methyl-phosphorodithioic,
O,O-diphenyl-phosphorodithioic,
O,O-di-4-chlorophenyl-phosphorodithioic,
O-phenyl-O-methyl-phosphorodithioic,
O-4-chlorophenyl-O-methyl-phosphorodithioic,
O-phenyl-O-ethyl-phosphorodithioic, or
O-phenyl-O-isopropyl-phosphorodithioic.

In effecting the preparational reaction of the amide of Formula II with the phosphorus acid of Formula III the conditions and procedures used can be widely varied. Typically, the reaction can be effected by simply reacting the desired amide with the desired acid preferably in the form of a salt such as a potassium salt in the presence of a suitable inert solvent such as acetone at reflux temperature for a period sufficient to effect the desired reacton. The ratio of the reactants is not usually important and a stoichiometric quantity of the amide and the acid salt can be suitably used. When the reaction is complete, the desired product can be recovered from the reaction mixture and purified by conventional techniques including filtration, distillation and recrystallization.

In preparing the compounds of this invention it may be desirable to effect the preparation in two reaction steps rather than in one step as described above. This may be particularly desirable when preparing compounds where the Y of Formula I is other than hydrogen or alkyl, such as acyl, alkoxycarbonyl, alkylthiocarbonyl or a carbamoyl radical. This two step synthesis can be effected by first preparing the compounds of this invention represented by Formula I where Y is hydrogen as described above and then reacting the compounds thus prepared with a suitable reactant to form the corresponding compounds having the desired Y substituent. For example, when Y is to be acyl, then the reactant can be an acyl halide containing from 1 to about 5 carbon atoms such as acetyl-, propionyl-, or butyryl-chloride when Y is to be alkoxycarbonyl or alkylthiocarbonyl, then the reactant can be an alkyl ester of haloformic or halo-thioformic acids, respectively, where the alkyl portion contains from 1 to about 5 carbon atoms such as methyl-, ethyl-, or propylchloroformate or chlorothioformate; and when Y is to be a carbamoyl radical, then the reactant can be an isocyanate or carbamoyl chloride such as potassium-, methyl-, or ethyl-isocyanate, N,N-diphenyl carbamoyl chloride, N,N-dimethyl carbamoyl chloride or N-phenyl carbamoyl chloride.

In reacting the above reactants with an amide of Formula II where Y is hydrogen to prepare the compounds of Formula I where Y is other than hydrogen or alkyl, the procedures and conditions utilized can be widely varied. Typically, however, those procedures and conditions which are conventionally used for similar O-alkylation or esterification reactions can be suitably utilized. Examples of the compounds of this invention which can be prepared by the above methods include:

N-3-chlorophenyl-N-hydroxy-α-(O,O-dimethyl-
 phosphorothioate)-acetamide,
N-3,4-dichlorophenyl-N-methoxy-β-(O,O-diethyl-
 phosphorothioate)-propionamide,
N-2,4,6-trichlorophenyl-N-acetoxy-α-(O-phenyl-O-
 methyl-phosphorothioate)-acetamide,
N-3,4-dichlorophenyl-N-methoxy-β-(O,O-di-4-
 chlorophenyl-phosphorothioate)-propionamide,
N-4-bromophenyl-N-hydroxy-α-(O,O-dimethyl-
 phosphorodithoate)-acetamide,
N-4-methylphenyl-N-(hydroxy-β-(O,O-diethyl-
 phosphorodithioate)-propionamide,
N-2,6-dimethylphenyl-N-acetoxy-α-(O-methyl-O-
 phenyl-phosphorodithioate)-acetamide,
N-4-ethylphenyl-N-methoxycarbonyloxy-α-(O-methyl-
 O-ethyl-phosphorodithioate)-acetamide,
N-3,4-dimethylphenyl-N-methoxy-β-(O,O-diphenyl-
 phosphorodithioate)-propionamide,
N-3,4-dimethylphenyl-N-methoxy-α-(O,O-di-4-
 chlorophenyl-phosphorodithioate)-acetamide,
N-3-nitrophenyl-N-ethoxy-α-(O,O-dimethylphosphoro-
 dithioate)-acetamide,
N-4-trichloroacetylphenyl-N-methylthiocarbonyloxy-α-
 (O-phenyl-O-ethyl-phosphorodithioate)-acetamide,
N-3-methoxyphenyl-N-carbamoyloxy-α-(O,O-diiso-
 propyl-phosphorodithioate)-acetamide, or
N-4-cyanophenyl-N-(N-methylcarbamoyloxy-α-(O,O-
 diethyl-phosphorodithioate)-acetamide.

The amide reactant of Formula II which is reacted with the phosphorus acid of Formula III to prepare the compounds of this invention can be obtained by initially preparing an amide of Formula II where Y is hydrogen by reacting an N-phenyl-hydroxylamine of the formula:

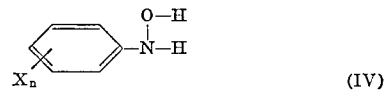

(IV)

with an acid halide of the formula:

(V)

where X, n, A and Hal have the same significance as for Formula II and III above. Suitable N-phenyl-hydroxylamines of Formula IV which can be utilized in the reaction include:

N-4-chlorophenyl-hydroxylamine,
N-3,4-dichlorophenyl-hydroxylamine,
N-4-bromophenyl-hydroxylamine,
N-4-methylphenyl-hydroxyamine,
N-3-methyl-4-chlorophenyl-hydroxylamine, N-4-ethylphenyl-hydroxylamine,
N-4-chloroethylphenyl-hydroxylamine,
N-4-nitrophenyl-hydroxylamine,
N-4-hydroxyphenyl-hydroxylamine, or
N-3-methoxy-4-chlorophenyl-hydroxylamine.

Examples of suitable acid halides represented by Formula V which can be reacted with the above N-phenyl-N-hydroxylamines include: bromoacetyl chloride, 3-chloropropionyl chloride, 2-chloropropionyl chloride, 4 - chloro-n-butyryl chloride, or 5-chloro-n-valeryl chloride.

In reacting the acid halide of Formula V with the N-phenyl-hydroxylamine of Formula IV to prepare the amide reactant of Formula II where Y is hydrogen the conditions and procedures used can be varied. In general, however, the conditions and procedures commonly utilized for similar reactions can be suitably employed. Typically, the desired N-phenyl-hydroxylamine is charged together with a suitable solvent such as dioxane, water and an acid acceptor such as sodium bicarbonate to a reaction vessel. Then, with the temperature maintained about 0° to 5° C., the desired acid halide is added. When the reaction is complete, the desired amide product is then recovered and purified by conventional techniques and then can be utilized as the starting material to prepare the compound of this invention.

When the amide reactant of Formula II is desired having Y other than hydrogen such as alkyl, acyl, alkoxy, carbonyl or alkylthiocarbamoyl or a carbamoyl radical, then the amide of Formula II having Y as hydrogen, as prepared above, can be further reacted with a suitable reactant to obtain the corresponding amide having the desired Y substituent. These reactants and the preparational procedures which can be employed are the same as those previously set forth in describing the alternate preparation of the compounds of this invention which involves reacting the compounds of Formula I where Y is hydrogen.

The compounds of this invention and their methods of preparation can be further illustrated by the following examples:

EXAMPLE 1

N-3,4-dichlorophenyl-N-hydroxy-α-(O,O-dimethylphosphorodithioate)-acetamide

About 4.0 grams (0.016 mol) of N-3,4-dichlorophenyl-N-hydroxy-chloroacetamide and 4 grams (0.020 mol) of potassium O,O-dimethylphosphorodithioate were charged together with 50 ml. of acetone to a reaction flask. With stirring, the mixture was heated at reflux for about 3½ hours. After cooling, the solids were removed by filtration and the solution distilled under reduced pressure to remove the solvent. The residue was dissolved in diethyl ether and the resultant solution was water washed and then dried over magnesium sulfate. After removing the diethyl ether under reduced pressure, the residue was recrystallized from a benzene-hexane mixture to yield 2.8 grams of a product having a melting point of 87° to 88° C.

Analysis for $C_{11}H_{14}Cl_2NO_4PS_2$.—Theoretical (percent): N, 3.72; P, 8.23; S, 17.03. Found percent: N, 3.71; P, 8.23; S, 17.17.

EXAMPLE 2

N-3-methylphenyl-N-methoxy-α-(O,O-dimethylphosphorodithioate)-acetamide

About 4.5 grams (0.021 mol) of N-3-methyl-phenyl-N-methoxy - chloroacetamide were reacted with 5 grams (0.027 mol) of potassium O,O-dimethylphosphorodithioate according to the general procedure of Example 1 to produce 4.4 grams of a liquid product having a refractive index $n_D^{27}$ 1.5744.

Analysis for $C_{12}H_{18}NO_4PS_2$.—Theoretical (percent). N, 4.18; P, 9.24; S, 19.12. Found (percent): N, 3.59; P, 10.30; S, 21.56.

EXAMPLE 3

N-3,4-dichlorophenyl-N-methoxy-α-(O,O-dimethylphosphorodithioate)-acetamide

About 5 grams (0.013 mol) of N-3,4-dichlorophenyl-N-methoxy-chloroacetamide were reacted with 4.7 grams (0.024 mol) of potassium O,O-dimethylphosphorodithioate according to the general procedure of Example 1 to produce 4.1 grams of a brown oil having a refractive index $n_D^{27}$ 1.5932.

Analysis for $C_{11}H_{14}Cl_2NO_4PS_2$.—Theoretical (percent): P, 7.94; N, 3.59; S, 16.43. Found (percent): P, 8.16; N, 3.60; S, 17.06.

EXAMPLE 4

N-4-chlorophenyl-N-methoxy-α-(O,O-dimethylphosphorodithioate)-acetamide

About 5 grams (0.021 mol) of N-4-chlorophenyl-N-methoxy-chloroacetamide were reacted with 5 grams (0.025 mol) of potassium O,O-dimethylphosphorodithioate according to the general procedure of Example 1 to produce 4.5 grams of a liquid product having a refractive index $n_D^{27}$ 1.5744.

Analysis for $C_{11}H_{15}ClNO_4PS_2$.—Theoretical (percent): P, 8.71; N, 3.95; S, 18.00. Found (percent): P, 8.37; N, 3.84; S, 18.22.

EXAMPLE 5

N-phenyl-N-methoxy-α-(O-phenyl-O-ethylphosphorodithioate)-acetamide

About 3 grams (0.015 mol) of N-phenyl-N-methoxy-chloroacetamide were reacted with 5.7 grams (0.021 mol) of potassium O-phenyl-O-ethylphosphorodithioate according to the general procedure of Example 1 to produce 4.0 grams of a liquid product having a refractive index $n_D^{27}$ 1.5929.

Analysis for $C_{17}H_{20}NO_4PS_2$.—Theoretical (percent): C, 51.38; H, 5.07; S, 16.13; N, 3.53; P, 6.79. Found (percent): C, 51.34; H, 4.98; S, 16.12; N, 3.88; P, 6.31.

EXAMPLE 6

N-phenyl-N-methoxy-α-(O,O-dimethylphosphorodithioate)-acetamide

About 3.0 grams (0.014 mol) of N-phenyl-N- methoxy-chloroacetamide were reacted with 3.5 grams (0.018 mol) of potassium O,O-dimethylphosphorodithioate according to the general procedure of Example 1 to produce 2.8 grams of an amber liquid having a refractive index $n_D^{28}$ 1.5712.

Analysis for $C_{11}H_{16}NO_4PS_2$.—Theoretical (percent): C, 41.11; H, 5.02; N, 4.37; P, 9.65; S, 19.95. Found (percent): C, 39.44; H, 5.03; N, 4.10; P, 7.80; S, 20.78.

As indicated, the compounds of this invention are useful as pesticides and particularly as fungicides, insecticides, nematocides and miticides. As used herein the term pesticide includes fungicide, nematocide, insecticide and miticide.

For practical use as pesticides, the compounds of this invention are generally incorporated into pesticidal compositions which comprise an inert carrier and a pesticidally toxic amount of the compound. Such pesticidal compositions, also defined as formulations, enable the active compound to be applied conveniently, in any desired quantity, to the site of the pest infestation, such as fungus, insect, nematode or mite infestation. These compositions can be solids such as dusts, granules, or wettable powders, or they can be liquids such as solutions, aerosols, or emulsifiable concentrates.

For example, dusts can be prepared by grinding and blending the active compound with a solid inert carrier such as the talcs, clays, silicas, pyrophyllite, and the like. Granular formations can be prepared by impregnating the compound, usually dissolved in a suitable solvent, onto and into granulated carriers such as the attapulgites or the vermiculites, usually of a particle size range of from about 0.3 to 1.5 mm. Wettable powders, which can be dispersed in water and/or oil to any desired concentration of the active compound, can be prepared by incorporating wetting agents into concentrated dust compositions.

In some cases the compounds are sufficiently soluble in common organic solvents such as kerosene or xylene so that they can be used directly dissolved in such solvents. Frequently, these solutions can be dispersed under superatmospheric pressure as aerosols. However, preferred liquid pesticidal compositions are emulsifiable concentrates, which comprise one or more compound according to this invention and as the inert carrier, a solvent and an emulsifier. Such emulsifiable concentrates can be extended with water and/or oil to any desired concentration of the compound for application as sprays to the site of the pest infestation. The emulsifiers most commonly used in these concentrates are nonionic or mixtures of nonionic with anionic surface-active agents.

A typical pesticidal composition according to this invention is illustrated by the following example, in which the quantities are in parts by weight.

EXAMPLE 7

Preparation of a dust

| | |
|---|---|
| Product of Example 1 | 10 |
| Powdered talc | 90 |

The above ingredients are mixed in a mechanical grinder-blender and are ground until a homogenous, free-flowing dust of the desired particle size is obtained. This dust is suitable for direct application to the site of the pest infestation.

The compounds of this invention can be applied as pesticides in any manner recognized by the art. One method for destroying pests comprises applying to the locus of the pest infestation a pesticidal composition comprising an inert carrier and as the essential active ingredient, in a quantity which is toxic to said pests at least one of the compounds of this invention. The concentration of the compounds of this invention individually or in admixture in the pesticidal compositions will vary greatly depending on the type of formulation and the purpose for which it is designed, but generally the compositions will contain from about 0.05 to about 95 percent by weight of the compounds of this invention. In a preferred embodiment of this invention, the pesticidal compositions will contain from about 5 to 75 percent by weight of the compound. The compositions can also contain additional substances such as other pesticides, stabilizers, spreaders, deactivators, adhesives, stickers, fertilizers, or activators.

When the compounds of this invention are used as insecticides they can be employed in several different ways. When used as stomach poisons or protective materials they can be applied to the surface on which the insects feed or travel. When the compounds are to be used as contact poisons or eradicants they can be applied directly to the body of the insect, as a residual treatment to the surface on which the insect may walk or crawl, or as a fumigant treatment of the air which the insect breathes. In some cases, the compounds applied to the soil or plant surfaces are taken up by the plant, and the insects are poisoned systemically.

The above methods of using insecticides are based on the fact that almost all the injury done by insects is a direct or indirect result of their attempts to secure food. Indeed, the large number of destructive insects can be classified broadly on the basis of their feeding habits. Among the insects which can be effectively controlled by the compounds of the present invention are the chewing insects such as the Mexican bean beetle, the southern armyworm; the piercing-sucking insects, such as the pea aphid, the cereal leaf beetle, the house fly, the grape leafhopper, the chinch bug, the lygus bugs, oyster shell scale, the California red scale, the Florida red scale, the soft scale and mosquitoes; the internal feeders, including borers such as the European corn borer, the peach twig borer and the corn earworm, worms or weevils such as the codling moth, alfalfa weevil, cotton boll weevil, pink boll worm, plum curculio, red banded leaf roller, melonworm, cabbage looper and apple maggot, leaf miners such as the apple leaf miner, birch leaf miner and beet leaf miner, and gall insects such as the wheat joint worm and the grape phylloxera. Insects which attack below the surface of the ground are classified as subterranean insects and include such destructive pests as the wooly apple aphid, the Japanese beetle, the onion maggot and the corn rootworm.

Mites and ticks are not true insects. Many economically important species of mites can be controlled by the compounds of this present invention such as the red spider mite, the two spotted mite, the strawberry spider mite, the citrus rust mite, the cattle tick, the poultry mite, the citrus red mite and the European red mite. Chemicals useful for the control of both mites and ticks are known specifically as acaricides.

The quantity of active compound of this invention to be used for insect control will depend on a variety of factors, such as the specific insect involved, intensity of the infestation, weather, type of environment, type of formulation, and the like. For example, the application of only one or two ounces of active chemical per acre may be adequate for control of a light infestation of an insect under conditions unfavorable for its feeding, while a pound or more of active compound per acre may be required for the control of a heavy infestation of insects under conditions favorable to their development.

When the compounds of this invention are used as agricultural fungicides, they can be applied to plant foilage, to seeds, to the soil, or to such parts of plants as the fruits themselves. Plants are susceptible to a great many diseases which cause widespread damage; and among some of the more important which can be mentioned are late blight on tomato, powdery mildew on cucumber (*Erisiphe cichoracearum*), cereal leaf rust on wheat (*Puccinia rubigo-vera*), and such common soil fungi as fusarium wilt (*Fusarium oxysporum*), the seed rot fungus (*Phythium debaranum*), and the sheath and culm blight (*Rhizoctonia solani*). The new compounds of this invention can also be employed as industrial fungicides to control a variety of fungi which attack such materials as adhesives, cork, paints, lacquers, leather, wood, plastics, and textiles such as cotton and wool.

The quantity of active compound of this invention to be used for good disease control will depend on a variety of factors, such as the particular disease involved, the intensity of the infestation, formulation, weather, type of crop and the like. Thus, while the application of only one or two ounces of active compound per acre of a crop may be sufficient to control a light infestation per acre may be required to control a heavy infestation of a hardy species of fungus.

When the compounds of this invention are used as nematocides to control or prevent infestations of destructive nematodes, they are ordinarily used as soil treatments. Plant parasitic nematodes occur in enormous numbers in all kinds of soil in which plants can grow, and many plant pathologists belives that all the crop and ornamental plants grown in the world can be attacked by these nematodes. The destructive species of nematodes range from the highly specialized, which attack only a few kinds of plants, to the polyphagous, which attack a great many different plants. The plants almost invariably become infected by nematodes that move into them from the soil. The underground parts of plants, roots, tubers, corns, and rhizomes are thus more apt to be infected than above-ground parts, but infection of stems, leaves, and flower parts is also fairly common.

9

Damage to plants attacked by nematodes is due primarily to the feeding of the nematodes on the plant tissues. The nematodes may enter the plant to feed, may feed from the outside, or be only partially embedded. The feeding of a nematodes may kill the cell or may simply interfere with its normal functioning. If the cell is killed, it is often quickly invaded by bacteria or fungi. If the cell is not killed, it and the adjacent cells may be stimulated to enlarge or multiply. Hence the most common types of nematode damage are manifested as rotting of the attacked parts and adjacent tissue or the development of galls and other abnomal growths. Either can interfere with the orderly development of the plant and cause shortening of stems or roots, twisting, crinkling or death of parts of stems and leaves, and other abnormalities. Consequently, the yield of crop plants is reduced, while a high-quality crop cannot be produced from the crippled plants.

The use of the compounds of this invention for nematode control can make the difference between a good crop and one not worth harvesting. Once the nematodes are controlled, yield increases of 25 to 50 percent are not uncommon. The solid or liquid nematocidal compositions of this invention can be applied to the soil, or in some cases to the plants and soil, in any convenient manner. While broadcast applications to the soil before planting by conventional plow or disc methods are effective, specialized methods such as row placement application, split-dosage application, post-planting sidedress applications, and the like are also useful. The active compounds of this invention are applied in amounts sufficient to exert the desired nematocidal action. The amount of the active compound present in the nematocidal compositions as actually applied for preventing or controlling nematode infestations varies with the type of application, the particular species which are to be controlled, and the purpose for which the treatment is made.

The compounds of this invention can be combined with different fungicides, miticides, nematocides, or insecticides, or combinations thereof to form either synergistic pesticide compositions or pesticide compositions capable of more than pesticidal activity. For example, the compounds may be combined with insecticides such as halogenated compounds for example, DDT, methoxychlor, TDE, lindane, chlordane, isobenzan, aldrin, dieldrin, heptachlor, endrin, mirex, endosulfon, dicofol, and the like; organic phosphorus compounds, for example, TEPP, schradan, ethion, parathion, methyl parathion, EPN, demeton, carbonphenothion, phorate, zinophos, diazinion, malathion, mevinphos, dimethoate, DBD, ronnel, oxydemeton-methyl, dicapthon, chlorothion, phosphamidon, naled fenthion, trichloro, or DDVP; organic nitrogen compounds, for example, dinitro-o-cresol, dinitrocyclohexylphenol, DNB, DNP, binapacril, azobenzene, and the like; organic carbamate compounds, for example, carbaryl or ortho 5353, organic sulfur compounds for example phenothiazine, phenoxathin, lauryl thiocyanate, [bis-(2-thiocyanoethyl) ether] or isobornyl thiocyanoacetate; as well as such substances usually referred to as fumigants, as hydrogen cyanide, carbon tetrachloride, calcium cyanide, carbon disulfide, ethylene dichloride, propylene dichloride ethylene dibromide, ethylene oxide, methyl bromide or paradichlorobenzene, with fungicides such as ferbam, nabam, zineb, ziram, thiram, chloranil, dichlone, glyodin, cycloheximide, dinocap, maneb, captan, dodine, PCNB, or p-dimethylaminobenzenediazo sodium sulfonate or with nematocides such as chloropicrin, O,O-diethyl-O-(2,4 - dichlorophenyl) phosphorothioate, tetrachlorothiopene, dazomet, or dibromochloropropane, with miticides such as O,O-diisopropyl-S-(isopropylthiomethyl) phosphorodithioate, O,O - diisopropyl-S-diethyldithiocarbamoyl phosphorodithioate, dimefox, or dimethoate.

The following examples are offered to illustrate the pesticidal activity of the compounds of this invention:

10

EXAMPLE 8

The fungicidal activity of the compounds of this invention can be demonstrated by the following tests:

An emulsifiable concentrate containing the test compound at a rate of 25 mg. per ml. was prepared by dissolving the compound in a suitable solvent such as acetone containing a surface active agent (polyoxyalkylene derivatives of sorbitan monolaurate and/or monooleate, 2.48 mg. per 80 ml. of acetone).

One of the compounds was used to control the fungus *Phytophthora infestans* (late blight of tomato). An aqueous fungicidal composition was prepared by admixing the above concentrate with a quantity of water sufficient to provide the desired concentration of the test compound. Susceptible species of tomato plants in individual paper pots were sprayed with the pesticidal composition when they had grown to a height of approximately 6 to 8 inches. A number of the plants were not sprayed and were used for comparative purposes. After the sprayed plants had dried, both series of plants were sprayed with a suspension of the fungus spores which had been reared on lima bean agar. After a few days to one week, the disease symptoms in the treated plants were observed and rated in comparison to the untreated plants. The results of the tests were as follows:

| Test compound | Concentration [1] | Percent control |
|---|---|---|
| N-3,4-dichlorophenyl-N-hydroxy-α-(O,O-dimethylphosphorodithioate)-acetamide | 1,000 | 97.6 |
| Do | 200 | 44.3 |

[1] Parts per million by weight.

Certain of the compounds were used to control the fungus *Fusarium oxysporum* by first preparing an aqueous fungicidal composition by admixing the above emulsifiable concentrate with water. Soil samples were prepared by placing about 100 ml. of soil into a series of paper cups. This soil had been inoculated with fungus obtained from a culture ranging in age of from about 10 to 14 days. A portion of the soil samples were treated by drenching the soil in the cups with a quantity of the fungicidal composition sufficient to provide the desired application rate of the test compound. The other portion of the soil samples was not so treated and was used for comparative purposes. All of the cups were then sealed and stored under conditions favorable to fungus growth for a period ranging from about 2 to 4 days. At the end of the period, the cups were opened and the growth on the surface of the soil was observed. The growth of the fungus on the surface of the treated samples was rated in comparison to the growth on the untreated samples on a percentage basis of the ability of the test compound to control or retard fungus growth.

The results of the test were as follows:

| Test compound | Concentration | Percent control |
|---|---|---|
| N-3,4-dichlorophenyl-N-methoxy-α-(O,O-dimethylphosphorodithioate)-acetamide | 100 | 91.7 |
| N-3,4-dichlorophenyl-N-hydroxy-α-(O,O-dimethylphosphorodithioate)-acetamide | 100 | 98.3 |

[1] Lb./acre of 4 inch depth.

EXAMPLE 9

The nematocidal activity of the compounds of this invention can be demonstrated by the following tests:

A sample of inoculated soil was prepared by mixing one part of sand, four parts of sterilized soil and three parts of soil from a four month old rootknot nematode culture (Meloidogyne spp.). A portion of the soil sample was treated by adding the emulsifiable concentrate as prepared in Example 8 in an amount sufficient to provide the soil with the desired concentration of the test compound. Another portion of the soil was not so treated and was used for comparative purposes. The treated soil as well as the untreated soil was placed into a series of plastic bags contained in glass mason jars. The jars were sealed and stored at 70° F. for a period of about 7 days. At the end of this period the soil was transferred to plastic pots and tomato seedlings (Bonny Best) were planted in the soil. After 20 days the soil was washed from the tomato plants and the number of rootknot nematode galls on the plants were counted. The degree of the nematode control of the test compound was evaluated on a percentage basis in comparison to the degree of galling in the untreated plants. The results of the tests were as follows:

Test compound—N-phenyl - N - methoxy-α-(O-phenyl-O-ethylphosphorodithioate)-acetamide
Concentration; lb./acre of 4 inch depth—100
Percent control—60

The nematocidal activity of the compounds was further demonstrated in another test for the control of rootknot nematode. An inoculated soil sample prepared as above was placed in 4 inch plastic pots and manually compacted. A nematocidal composition was prepared by admixing the emulsifiable concentrate as prepared in Example 8 with water. The soil in one series of the pots was treated by drenching the soil in each pot with the nematocide composition in an amount sufficient to provide the desired concentration of the test compound. The other series of the pots was not so treated and was used for comparative purposes. Both series of pots were placed in a greenhouse and held for 7 days whereupon 10 to 14 day old tomato seedlings (Bonny Best) were planted in the pots. After about 2 weeks, the degree of nematode control was evaluated by comparing the number of rootknot nematode galls on the roots of the plants grown in the treated soil with the number of galls on the plants grown in the untreated soil. The results of the test were as follows:

Test compound—N-phenyl-N-methoxy-α-(O,O-dimethylphosphorodithioate)-acetamide
Concentration: lb./acre of 4 inch depth—100
Percent control—81.3

EXAMPLE 10

The miticidal activity of the compounds of this invention can be demonstrated by the following tests:

An aqueous miticidal composition was prepared by admixing the emulsifiable concentrate as prepared in Example 8 with a quantity of water sufficient to provide the desired concentration of the test compound.

Excised lima bean plants were infested with a number of adult strawberry spider mites and the infested plants were then dipped into the miticidal composition and thereafter held for five days. The mortality rate was determined and the results of the test were as follows:

| Test compound | Concentration [1] | Percent mortality |
|---|---|---|
| N-phenyl-N-methoxy-α-(O-phenyl-O-ethyl-phosphorodithioate)-acetamide | 0.35 | 100 |
| N-phenyl-N-methoxy-α-(O,O-dimethylphosphorodithioate)-acetamide | 0.10 | 100 |
| | 0.35 | 96 |
| N-3,4-dichlorophenyl-N-methoxy-α-(O,O-dimethylphosphorodithioate)-acetamide | 0.10 | 94 |
| | 0.35 | 100 |
| | 0.10 | 100 |

[1] Percent of compound in aqueous composition.

EXAMPLE 11

The insecticidal activity of the compounds of this invention can be demonstrated by the following tests.

An aqueous insecticidal composition was first prepared by admixing the emulsifiable concentrate as prepared in Example 8 with a quantity of water sufficient to provide the desired concentration.

Fifty adult houseflies contained in a cage were sprayed with the composition. The knockdown rate after 2 hours and the mortality rate after 24 hours were observed and the results were as follows:

| Test compound | Concentration | Percent mortality (24 hours) |
|---|---|---|
| N-phenyl-N-methoxy-α-(O-phenyl-O-ethyl-phosphorodithioate)-acetamide | 0.35 | 100 |
| | 0.10 | 28 |
| N-phenyl-N-methoxy-α-(O,O-dimethylphosphorodithioate)-acetamide | 0.35 | 100 |
| | 0.35 | 100 |
| | 0.10 | 100 |

| | | Percent knockdown (2 hours) |
|---|---|---|
| Do | 0.35 | 100 |
| | 0.10 | 100 |
| N-3,4-dichlorophenyl-N-methoxy-α-(O,O-dimethylphosphorodithioate)-acetamide | 0.35 | 100 |

| | | Percent mortality (24 hours) |
|---|---|---|
| Do | 0.35 | 100 |
| N-3-methylphenyl-N-methoxy-α-(O,O-dimethylphosphorodithioate)-acetamide | 0.10 | 94 |
| | 0.10 | 92 |

[1] Percent of compound in aqueous composition.

Southern armyworms (S.A., late third instar stage) and Mexican bean beetle (M.B.B., late second instar stage) were offered for feeding lima bean leaves which had been dipped into the insecticidal composition. After a 48 hour feeding period, the mortality rate was determined and the results were as follows:

| Test compound | Concentration [1] | Percent mortality S.A. | Percent mortality M.B.B. |
|---|---|---|---|
| N-phenyl-N-methoxy-α-(O-phenyl-O-ethylphosphorodithioate)-acetamide | 0.35 | 40 | 100 |
| | 0.10 | | 100 |
| N-phenyl-N-methoxy-α-(O,O-dimethylphosphorodithioate)-acetamide | 0.35 | 90 | 100 |
| | 0.10 | 80 | 100 |
| N-3,4-dichlorophenyl-N-methoxy-α-(O,O-dimethylphosphorodithioate)-acetamide | 0.35 | 100 | 100 |
| N-3-methylphenyl-N-methoxy-α-(O,O-dimethylphosphorodithioate)-acetamide | 0.35 | 80 | 100 |
| | 0.10 | 70 | 100 |

[1] Percent compound in aqueous composition.

Adult pea aphids were sprayed with the insecticidal composition and then transferred to pea plants which had been previously sprayed. After 48 hours the mortality rate was determined and the results were as follows:

| Test compound | Concentration [1] | Percent mortality |
|---|---|---|
| N-phenyl-N-methoxy-α-(O-phenyl-O-ethyl-phosphorodithioate)-acetamide | 0.35 | 100 |
| | 0.10 | 100 |
| N-phenyl-N-methoxy-α-(O,O-dimethyl-phosphorodithioate)-acetamide | 0.35 | 100 |
| | 0.10 | 100 |
| N-3-methylphenyl-N-methoxy-α-(O,O-dimethylphosphorodithioate)-acetamide | 0.35 | 100 |
| | 0.10 | 100 |

[1] Percent compound in aqueous composition.

We claim:
1. A compound of the formula

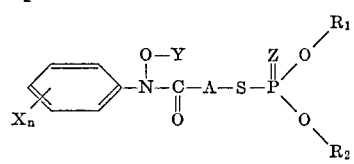

wherein $n$ is an integer of from 0 to 3; X is selected from the group consisting of a halogen; alkyl of up to about 5 carbon atoms having from 0 to 3 substituents selected from the group consisting of halo, hydroxy, and alkoxy of 1 to about 5 carbon atoms; hydroxy; and alkoxy of from 1 to about 5 carbon atoms; Y is selected from the group consisting of hydrogen; alkyl of from 1 to about 5 carbon atoms having from 0 to 3 substituents selected from the group consisting of halo, hydroxy, and alkoxy of 1 to about 5 carbon atoms; A is alkylene from 1 to 3 carbon atoms; Z is selected from the group consisting of oxygen and sulfur; and $R_1$ and $R_2$ are selected from the group consisting of phenyl and alkyl of from 1 to about 5 carbon atoms having 0 to 3 substituents selected from the group consisting of halo, hydroxy, and alkoxy of from 1 to about 5 carbon atoms.

2. The compound of claim 1 wherein Y is hydrogen.
3. The compound of claim 1 wherein Y is alkyl.
4. The compound of claim 1 wherein A is methylene.
5. The compound of claim 1 wherein Z is sulfur.
6. The compound of claim 1 wherein it is N - phenyl- N - methoxy - $\alpha$ - (O,O - dimethylphosphorodithioate)-acetamide.
7. The compound of claim 1 wherein it is N - 3,4-dichlorophenyl - N - hydroxy - $\alpha$ - (O,O - dimethylphosphorodithioate)-acetamide.
8. The compound of claim 1 wherein it is N - 3 - methylphenyl - N - methoxy - $\alpha$ - (O,O - dimethylphosphorodithioate)-acetamide.
9. The compound of claim 1 wherein it is N - 3,4 - dichlorophenyl - N - methoxy - $\alpha$ - (O,O - dimethylphosphorodithioate)-acetamide.
10. The compound of claim 1 wherein it is N - 4-chlorophenyl - N - methoxy - $\alpha$ - (O,O - dimethylphosphorodithioate)-acetamide.
11. The compound of claim 1 wherein it is N - phenyl- N - methoxy - $\alpha$ - (O - phenyl - O - ethylphosphorodithioate)-acetamide.

References Cited

UNITED STATES PATENTS 3,092,541  6/1963  Beriger _____ 260—943X

CHARLES B. PARKER, Primary Examiner

A. H. SUTTO, Assistant Examiner

U.S. Cl. X.R.

260—455, 551, 938, 940, 941, 979; 424—211

PO-1050
(5/69)

UNITED STATES PATENT OFFICE
CERTIFICATE OF CORRECTION

Patent No. 3,595,945        Dated July 27, 1971

Inventor(s) John Krenzer and Sidney B. Richter

It is certified that error appears in the above-identified patent and that said Letters Patent are hereby corrected as shown below:

In column 5, line 59 for "$C_{11}H_{14}Cl_2 NO_4 PS_2$" read --$C_{10}H_{12}Cl_2 NO_4PS_2$---.

In column 5, line 72 for "$n_D^{27}$ 1.5744" read --$n_D^{28}$ 1.5653--.

In column 8, line 56 after "infestation" insert --of certain fungi, a pound or more of active compound--.

In column 12, line 9 delete "0.35" and "100"; insert in column 12, line 21 --0.35--and --100--.

Signed and sealed this 21st day of March 1972.

(SEAL)
Attest:

EDWARD M. FLETCHER, JR.      ROBERT GOTTSCHALK
Attesting Officer             Commissioner of Patents